March 2, 1943. C. U. GRAMELSPACHER 2,312,333
VENEER MOLDING PROCESS
Original Filed Aug. 11, 1939   3 Sheets-Sheet 1
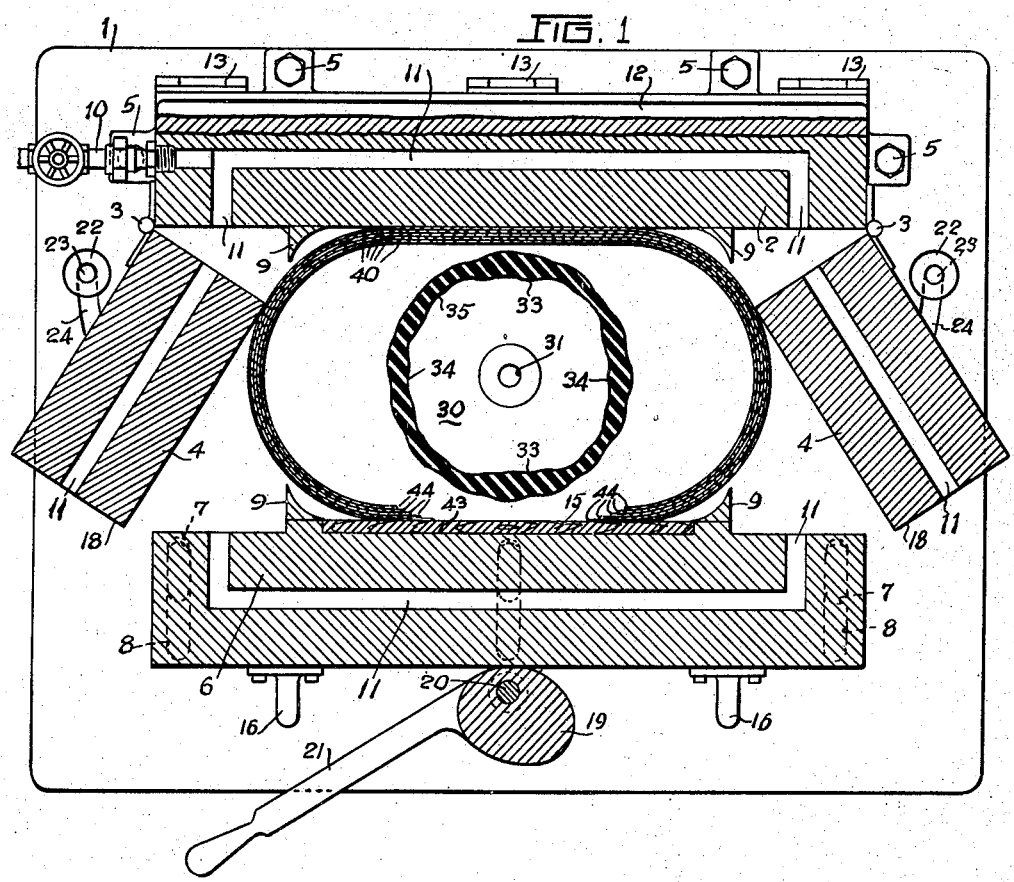
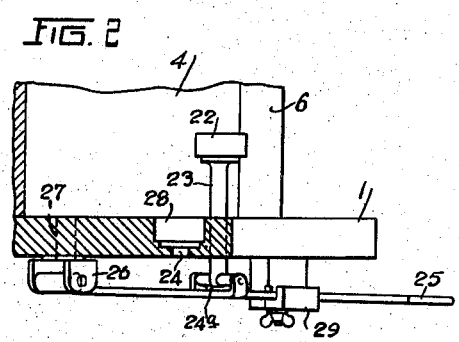
Inventor
CLARENCE U. GRAMELSPACHER
Attorneys March 2, 1943.                C. U. GRAMELSPACHER                2,312,333
                               VENEER MOLDING PROCESS
                    Original Filed Aug. 11, 1939     3 Sheets-Sheet 2
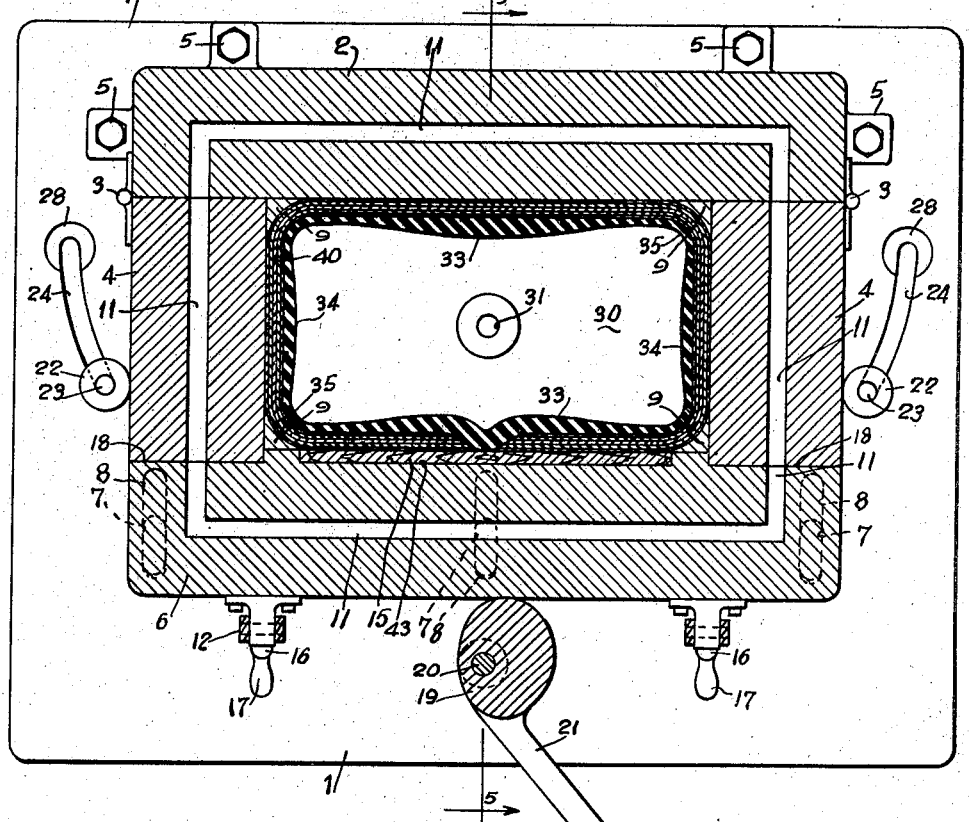
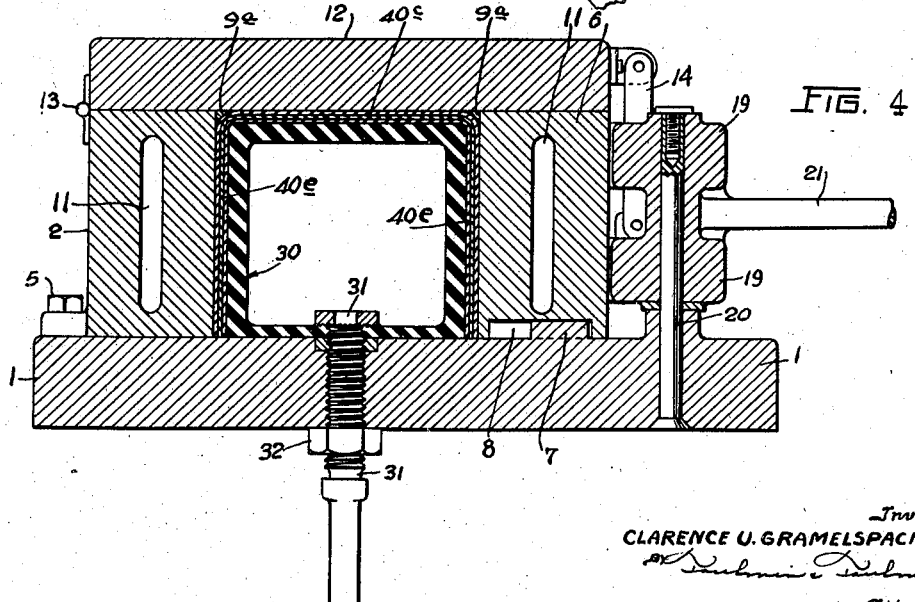
Inventor
CLARENCE U. GRAMELSPACHER,
Attorneys March 2, 1943.  C. U. GRAMELSPACHER  2,312,333
VENEER MOLDING PROCESS
Original Filed Aug. 11, 1939  3 Sheets-Sheet 3
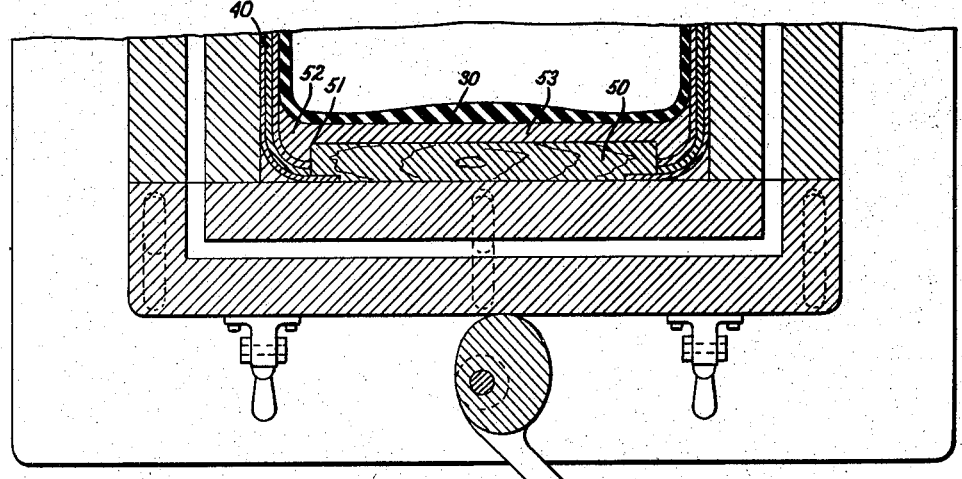
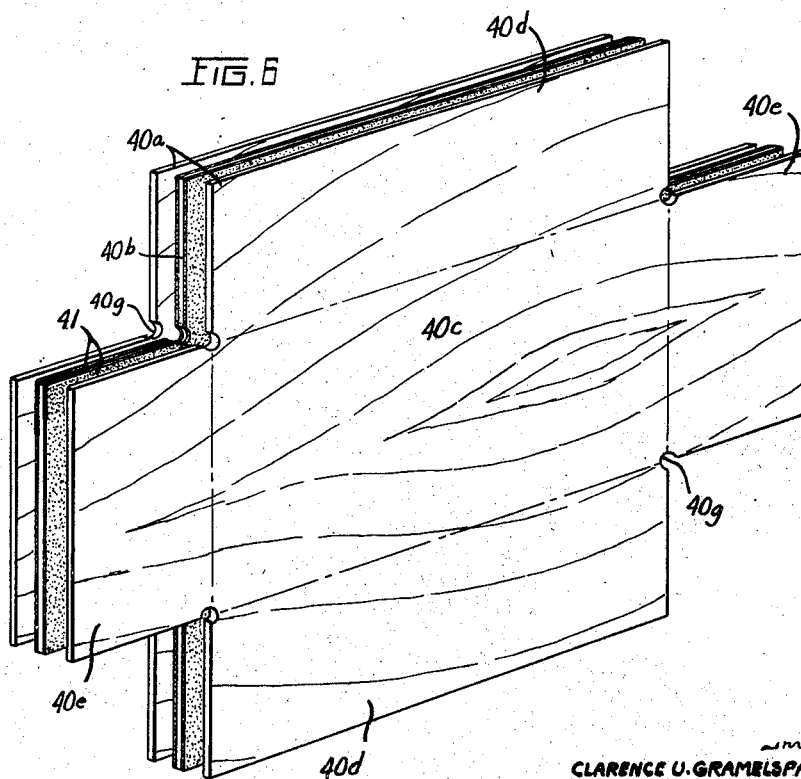
CLARENCE U. GRAMELSPACHER, Patented Mar. 2, 1943

2,312,333

UNITED STATES PATENT OFFICE 2,312,333

VENEER MOLDING PROCESS

Clarence U. Gramelspacher, Jasper, Ind.

Original application August 11, 1939, Serial No. 289,697. Divided and this application July 15, 1940, Serial No. 345,533

2 Claims. (Cl. 144—309)

This invention relates to a process for forming individual sheets of wood veneer or of very flexible plywood (say 2 or 3-ply) into articles of desired configuration and more particularly to a process of forming said sheets into articles embodying simple or compound curves. The present invention eliminates the necessity for first making a flat section of plywood and then bending it into the desired shape by saw-kerfing, corrugating and the like. In a still more particular aspect, the present invention relates to a veneer molding process wherein pressure is exerted on the outside of the sheets to be joined and forming pressure is yieldingly exerted from the inside of the sheets outwardly as by means of an expansible bag. Pressure of any kind can be used for these purposes.

This application is a division of my copending application, Serial No. 289,697, filed August 11, 1939.

The principal object of the present invention is to devise a method of forming veneer or flexible plywood sheets which are free to slide relative to one another by exerting pressure outwardly from inside of the sheets, while holding the sheets from their exterior in such manner that the inwardly exerted pressure is effective; the pressure exerted from the outside cooperates with the pressure exerted from the inside to produce an article the configuration of which corresponds exactly to that of the outer mold member so that the shape and dimensions of the article are accurately known in advance.

Another object is to carry out a process of the foregoing type wherein the inner mold member is in the form of an expansible bag member which is expanded evenly outwardly over the entire inside area of the sheets to be formed by means of a fluid under pressure admitted thereto, such as steam, air or other gas under pressure, or a liquid such as water, oil, or other suitable hydraulic liquid under pressure.

Another object is to devise a process of the type above set forth wherein at least one of each pair of adjoining surfaces of the sheets of veneer or thin plywood is precoated with an adhesive which is either liquid at the time of assembly or which becomes liquid under the conditions of molding; this liquid adhesive acts as a lubricant allowing the individual sheets to slide relative to one another, this shifting enabling the quick formation of a more perfect article wherein none of the individual sheets is under stress or tension relative to any other sheet, absolute concentricity throughout the curves being obtained.

Yet another object is to carry out a process of the type described above wherein heat is applied to the sheets during the molding process in order to dry and harden the glue or to set the resin where a thermo-setting resin adhesive is employed; this heat may be applied to the sheets from either the outside or the inside; a convenient method is to employ cored outer mold members and to pass a suitable hot fluid under pressure into the expansible bag to serve the dual purpose of expanding the same to shape the article and to heat the sheets constituting the article.

Another object is to carry out a process of the foregoing type wherein a base member connects the ends of the veneer or plywood sheets.

Another object is to provide an expansible bag of variable thickness or consistency so that when pressure is exerted against the inside of the clamping form this pressure will be exerted evenly over the entire area; for example, if a spherical bag is used in a rectangular article the pressure on the corners will not be as great as the pressure on the sides; however, I have discovered that this effect can be compensated for to a large extent by designing the bag so that the portions for contacting the sides are relatively thick and progressively thin out to the portions which contact the corners.

Another object is to devise apparatus for carrying out the foregoing process.

Another object is to devise a method and apparatus for molding internally irregularly shaped articles which involves utilization of a rigid mold member contacting on one side the irregular surface, such as an internal insert, and on the other side, which is smooth, the expansible bag.

Other objects will more fully hereinafter appear.

In the accompanying drawings:

Figure 1 is a horizontal section through a mold for a four sided radio cabinet, as an example, having a baseboard and shows the individual veneer sheets in place with the outer mold members about to be clamped about them and with the expansible rubber bag inner mold member in collapsed form. The showing of a radio cabinet is merely an example of an article which can be molded by this process.

Figure 2 is a detail section showing the external clamping and locking means for the end walls.

Fig. 3 is a horizontal section showing the mold in closed position and the bag expanded; the bag is shown as thinned in those areas where expansion is most extensive.

Figure 4 is a vertical sectional view showing the preparation of a five sided article from the flat individual sheets of Figure 6; the openings left at the corners formed by the adjacent side walls will subsequently be filled in any desirable manner to make a complete five sided enclosure.

Figure 5 is a horizontal section showing a modification in which an insert extends inwardly from the inner face of the article causing sharp internal angles, a rigid auxiliary mold member being provided to present a smooth face to the expansible bag and to transmit the pressure thereof evenly to the insert and the plywood portion of the article.

Figure 6 is a perspective view showing the laminations of veneer cut for a still further modification; this view is also an example of the procedure wherein alternate laminations are adhesively coated on both sides and the other alternate laminations are uncoated.

Referring first to Figures 1 to 3 of the drawings, reference numeral 1 designates a supporting base for the molding device. To base 1 is attached by means of bolts 5 a vertical rear wall 2 which is stationary and forms a rear mold member. Hinged to rear wall 2 by means of hinges 3 are end walls 4 which are adapted to be swung outwardly until parallel with rear wall 2, or even further if desired, to allow the lamination assembly to be inserted in the mold. A front mold wall 6 is slidably mounted on base 1 by means of a plurality of elongated pins 7 projecting upwardly from and integral with base 1 (see Figure 4) and which are received within slots 8 in the bottom of wall 6. Slots 8 are elongated in the direction in which front wall 6 is slidable.

Front wall 6 is provided on its inward face with an outward recess 43 to receive the baseboard 15 of the exemplary radio cabinet or other object to be molded. Front wall 6 and rear wall 2 are provided with inwardly extending curved corner mold members 9 which may be integral with the walls and which serve to impart the desired curved configuration to the corners of the cabinet. Front wall 6, rear wall 2 and end walls 4 are provided with cored passageways 11 which are adapted to be supplied with steam or other hot fluid by an inlet pipe 10 for the purpose of heating the laminations during molding. Any suitable means (not shown) such as a resilient gasket may be provided to seal the passages 11 at the point where they interconnect between adjacent mold walls.

A mold cover 12 hinged at 13 to rear wall 2 is adapted to be clamped down over the closed mold preparatory to molding and locked in its clamped position by means of links 14 (see Figure 4) pivoted to the forwarded edge of cover 12 adapted to be locked over hook members 16 fixedly mounted on the front face of front wall 6 by hand locking members 17 pivotally carried on the lower end of links 14.

Frontwall 6 is adapted to be moved inwardly into clamping position against the ends 18 of inwardly swung end walls 4 thereby clamping the end walls 4 tightly between rear wall 2 and front wall 6. To this end, a cam clamping member 19 having a handle 21 is pivoted about a vertical pivot member 20 fixedly mounted in base 1. Cam member 19 is adapted to engage the front face of front wall 6 and to urge wall 6 inwardly into a firmly clamped position and to lock it in this position by reason of the frictional engagement of cam 19 with wall 6.

End walls 4 are adapted to be locked in their inward position by means of circular heads 22 journaled on the upper ends of shanks 23 which extend downwardly (see Figure 2) through elongated curved slots 24 in base plate 1 into hinged engagement 24a with a manually operated handle 25 pivoted so as to be swingable vertically about a member 26 which is pivoted so as to be swingable horizontally by a pivot member 27 extending pivotally upwardly into a recess in base plate 1. A circular recess 28 is provided at the outermost end of curved slot 24 to receive circular head 22 when the handle 25 is at its outermost position so that the top of head 22 may be flush with or below the upper surface of base 1 whereby interference with outward swinging of end walls 4 is prevented. A catch 29 is provided on the under face of base 1 into which handle 25 may be inserted to lock the same in clamped position thereby locking mold walls 4 in their inward position. To unlock walls 4, handle 29 is raised vertically out of catch 29 and is then swung outwardly and downwardly, thereby allowing walls 4 to move freely outwardly. Hinge 24a being at right angles to handle 25 allows shank 23 to remain vertical as handle 25 is raised and lowered, but prevents it from sliding out slot 24 due to the pressure of the mold wall.

While mechanical means is shown for clamping end walls 4 and front wall 6 and so designed as to give increased leverage as the walls close in on the article to be molded, it will be apparent that any external means for exerting clamping pressure inwardly may be employed, such as suitable hydraulic or pneumatic means.

An expansible bag 30 of rubber or the like is provided within the mold cavity and designed when expanded to exert pressure outwardly on the article forcing the laminations outwardly against the externally clamped mold members. Bag 30 has an inlet 31, which extends downwardly through base 1, and may be semi-permanently left in the mold by means of nuts 32 on inlet stem 31. Bag 30 has walls of varying thickness in order that it may expand into substantially the shape of the article, expanding least for the sides of the article and most for the curved corners, and more for the ends which are further apart than for the sides which are closer together. Thus the bag is quite thick at 33 for the closely adjacent sides, is of less thickness at 34 for the less adjacent ends and is of still less thickness at 35 for the curved corners. In this way, pressure is exerted evenly over the entire inner surface of the article. The same effect may be obtained by varying the stretchability of the rubber in the bag walls. Less desirably, the bag may have uniform walls of uniform consistency. The bag may be preformed to approximate when collapsed the ultimate shape of the article, being slightly smaller than said ultimate shape.

Bag 30 may be inflated with any suitable fluid such as air under pressure, preferably to a pressure of 100 to 200 pounds per square inch. If it is desired to heat the article during molding, a hot fluid under pressure such as steam, or a hot liquid such as oil, diphenyl, diphenyl oxide, etc., is employed as the inflating fluid, either as the sole heating means or in addition to the employment of a heating medium in the outer mold members.

The veneer sheets indicated as 40 are pre-coated with a film 41 of adhesive which will act as a lubricant allowing the individual sheets to slide relative to one another during the molding. Instead of using veneer sheets, sheets of flexible plywood having an adhesive coating and sufficiently pliable to take the initial form may be employed, although the resulting article will not be quite as free of stress. Instead of precoating one side of each lamination, every other lamination may desirably be coated on both faces, thereby simplifying the precoating operation. While the following description refers to using a plurality of veneer sheets 40, it will be understood that flexible plywood sheets may be substituted for part or all thereof, if desired. The baseboard 15 is likewise initially provided with an adhesive coating. As will be seen by comparing Figures 1 and 3, baseboard 15 is adapted to be adhesively joined during the molding to the bottom of the completed article and to connect the ends of the plywood to form a closed article.

In carrying out a molding operation according to Figures 1 to 3, a pre-coated baseboard 15 is placed in the recess 43 of front wall 6 and a plurality of individual pre-coated veneer sheets 40 of the same width and of gradually decreasing length are placed in the mold with their middle portions against rear mold wall 2 and their progressively inwardly shorter ends 44 projecting out at the sides of the mold. Ends 44 are then tucked into the mold into the position of Figure 3. End walls 4 are then moved inwardly and clamped at their innermost position by handles 25. Front wall 6 is then moved inwardly and clamped by means of handle 21. Lid 12 is then moved downwardly and locked with locking members 17. Steam is then admitted to cored passageways 11 through inlet 10 to heat the mold, which is of metal, to the desired temperature, of say 250° to 300° F., but varying with the type of adhesive employed. Meanwhile bag 30 is inflated through inlet 31 to the desired pressure of 100 to 200 pounds per square inch. The assembly is then allowed to stand until the adhesive has set, which will require from 2 to 20 minutes, but here again the time required will depend on the adhesive used and the temperature employed. The bag is then deflated, the mold cover opened, and the molded cabinet removed.

In Figure 5, a modification is shown wherein sheets of veneer cut to proper length are used and a baseboard 50 is employed which projects inwardly so as to expose sharp edges 51 which would injure the rubber bag 30 and prevent the bag from filling the portion 52 thereadjacent. To prevent this, a metal (heat-conducting) auxiliary mold member 53 is employed which is shaped outwardly to fit insert 50 and the portions of veneer sheets 40 thereadjacent to thereby transfer pressure evenly to the article and which is smooth on its inward face to fit bag 30. In this way, the production of a perfectly formed article is insured.

In Figures 4 and 6, another modification is shown wherein the laminations 40a and 40b are pre-cut to form a bottom or front portion 40c and side portions 40d and end portions 40e. The intermediate lamination 40b is coated on both sides with adhesive 41 and the outer laminations 40a are uncoated. A cutout 40g is provided at each corner intersection of the sides and ends with the front to prevent the formation of an execessively compound curve at this point. The laminations are shaped into the five sided article in the manner illustrated in Figure 4, a curved member 9a being provided along each line of bend 40f, in order to give the desired curved configuration to the corners and to prevent unduly sharp bending. As before, the outward pressure of an expansible bag 30 shapes the laminations into the final desired shape. Subsequently, the openings left between the edges of the sides 40d and the ends 40e may be filled in any desired manner as, for example, with a suitably shaped piece of wood.

It may readily be seen that the article of invention, as disclosed in Figures 4 and 6, is in the nature of a five sided box having an open top. The side wall portions 40d and the end wall portions 40e of the precut blank sheets of wood are adapted to be flexed at the juncture of the side and end wall portions with the base portion 40c. The side wall portions 40d and the end wall portions 40e, when arranged to provide a finished product, are formed at substantially right angles to the base portion 50, whereby the adjacent edges of the side wall and end wall portions are adapted to engage and provide a sealed edge for the box structure.

It can readily be seen that the precut blank, as shown in Figure 6, may be formed in the same type of mold as disclosed in Figures 1 and 3, and by the same method. The side wall portions 40d and the end wall portions 40e may be flexed by any suitable manner at the juncture of the respective portion with the base portion 40c, and is then confined within the cavity provided by the walls of the mold. The mold is locked together in the manner as heretofore described with regard Figures 1 and 3, whereby the box-like article being formed will be retained within the mold cavity in rough configuration substantially that which it will assume when a finished product. The expansible bag 30 will then be filled with suitable pressure fluid for causing the expansion thereof and applying forming pressure to the walls of the roughly formed article within the mold cavity to cause the article to assume the configuration of the cavity.

While the article of manufacture, as disclosed in Figure 6, is arranged to provide a five sided rectangular box, it is within the scope of this invention that the blanks can be so precut as to form any configuration wherein there is provided a main base portion having a plurality of wall portions radiating therefrom and contiguous therewith.

It will be understood that I intend to include as within my invention such modifications as may be necessary to adapt it to varying conditions and uses and as fall within the spirit of the appended claims. For example, I may employ a thin flexible electrical heating element around the expansible bag to transmit the pressure of the bag to the article being formed while heating the same or may employ a metal internal mold member in a portion of the mold to transfer the pressure from the bag to the article or I may use a layer of cloth, asbestos, metal foil or the like in place of a layer of wood or in addition to the layers of wood. Similarly, while the above disclosure refers to liquid adhesive, I may use any adhesive in sheet form, such as "Tego" glue film which is a dry film on a very thin tissue base and which is placed between layers of veneer rather than coated thereupon. This film comprises a phenol-formaldehyde resin which polymerizes under heat, and moisture obtained from the veneers setting permanently after being subjected to heat for several minutes. Although such a dry film may not act as a lubricant for the veneer sheets, it does not in the least retard the sliding of the individual sheets I may also use other resins on the market which are allowed to dry after being spread on the veneer in liquid form and must be thoroughly dry before pressing, these resins usually requiring solvents other than water, such as alcohol or the like. In this way, I may avoid the use of aqueous liquid adhesives, the water of which may tend to swell or distort the sheets of veneer. Whereas I have illustrated the use of three and four laminations, I am not limited to three or four ply articles, but may employ any number of plies, depending upon the thickness, strength or shape required.

Having thus fully described my invention, what I claim as new and desire to secure by Letters Patent is:

1. A method of forming an article from individual sheets of wood, wherein the article has an irregular surface having sharp inward edges comprising disposing the sheets with adhesive between adjoining surfaces within a mold of approximately the desired form, inserting a baseboard having irregularly shaped side edges, so shaped as to conform to the said irregular surface of said sheets and inserting on the inside of the assembled sheets and baseboard a member having a smooth inner face and an opposite outer face shaped to correspond with the irregular face of the article, inserting an expansible member inwardly of said article, admitting a fluid under pressure to said expansible member to thereby expand the same against said first named member and the inside surfaces of said sheets and to exert forming pressure outwardly upon said sheets, and maintaining the fluid pressure until the adhesive between said sheets sets.

2. An apparatus for forming a laminated article from sheets of wood, said article including a base portion and contiguous wall portions extending therefrom and having an irregular inner surface having sharp edges produced by a baseboard having irregularly shaped side edges in abutting relation with the side edges of the sheets and the surface thereof extending beyond the inner surface of the sheets comprising, a mold having a plurality of movable walls to form a cavity shaped to the exterior configuration of the article being formed, said walls being movable to open said mold to permit insertion of the plurality of sheets of wood therein in adjacent relationship with adhesive therebetween and to permit the insertion of said baseboard, a filler member adapted to be disposed upon said baseboard having one smooth face and the opposite face thereof shaped to conform with the irregular surface formed by the baseboard, the walls of said mold being adapted to be closed upon the sheets to confine the same therein together with said baseboard and said filler member and cause the sheets to assume a configuration within the mold roughly that of the cavity, an expansible member positioned within said mold and within the confines of the roughly shaped article adapted to engage the inner surface of the article to be formed from said sheets and said filler member, and means for admitting fluid under pressure within said expansible member to expand the same outwardly against the sheets and said filler member to cause same to move into the proper position relative to each other and assume the configuration of the cavity and maintaining the pressure until the adhesive sets.

CLARENCE U. GRAMELSPACHER.